(12) United States Patent
Gelbard

(10) Patent No.: US 6,930,721 B2
(45) Date of Patent: Aug. 16, 2005

(54) LENS MOUNT APPARATUS FOR A HIGH DEFINITION VIDEO CAMERA

(75) Inventor: Richard Gelbard, Woodland Hills, CA (US)

(73) Assignee: Panavision Inc., Woodland Hills, CA (US)

( * ) Notice: Subject to any disclaimer, the term of this patent is extended or adjusted under 35 U.S.C. 154(b) by 835 days.

(21) Appl. No.: 09/809,407

(22) Filed: Mar. 15, 2001

(65) Prior Publication Data

US 2002/0130963 A1 Sep. 19, 2002

(51) Int. Cl.$^7$ .............................................. H04N 5/225
(52) U.S. Cl. ..................................... 348/360; 348/335
(58) Field of Search ............................... 348/335, 336, 348/340, 360, 373, 375, 207.99; 396/62, 132, 532

(56) References Cited

U.S. PATENT DOCUMENTS

| 4,642,692 A | | 2/1987 | Andrevski | |
|---|---|---|---|---|
| 5,400,072 A | * | 3/1995 | Izumi et al. | 348/335 |
| 5,627,589 A | * | 5/1997 | Ejima et al. | 348/340 |
| 5,889,555 A | * | 3/1999 | Kawase et al. | 348/336 |
| 5,978,602 A | * | 11/1999 | Toyofuku et al. | 396/62 |

FOREIGN PATENT DOCUMENTS

JP       03136479       6/1991

OTHER PUBLICATIONS

SONY Corporation: HD Camcorder HDW–f900 Maintenance Manual Part I, 1st edition Mar. 8, 2000, Japan XP002201371, p. 2–13 p. 7–1.
Clapp, Christina: "Image Acquisition at SMPTE: Format Wars, Episode 2" Directors World, Feb. 8, 2000, XP002201308.

* cited by examiner

Primary Examiner—Tuan Ho
(74) Attorney, Agent, or Firm—Morrison & Foerster LLP

(57) ABSTRACT

A lens mount apparatus for removably supporting interchangeable lenses on the front of a conventional professional HD video camera separately and alternatively to the lens mount provided with the video camera. A replacement face plate is mounted on the front of the video camera and has an alternate lens mount mechanism for receiving the interchangeably lenses without interfering with the lens mount of the video camera. Top and bottom plates are connected to the video camera and the face plate for providing a reinforced lens support structure. The conventional video lens mount and video image detector are adjustably mounted on the back of the lens mount mechanism and extend behind the replacement face plate for aligning the axes of the image detector with the alternate lens mount.

31 Claims, 16 Drawing Sheets

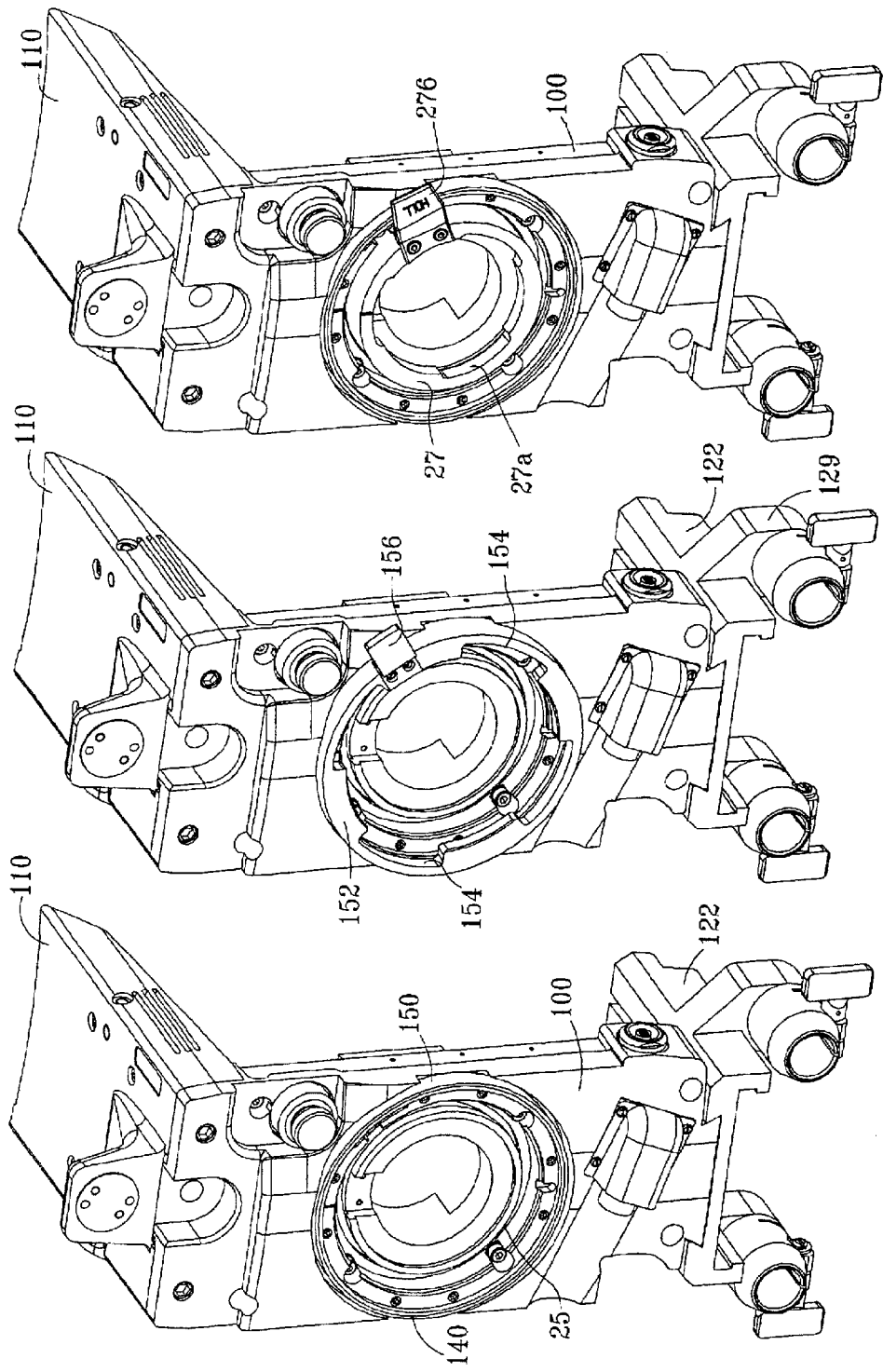

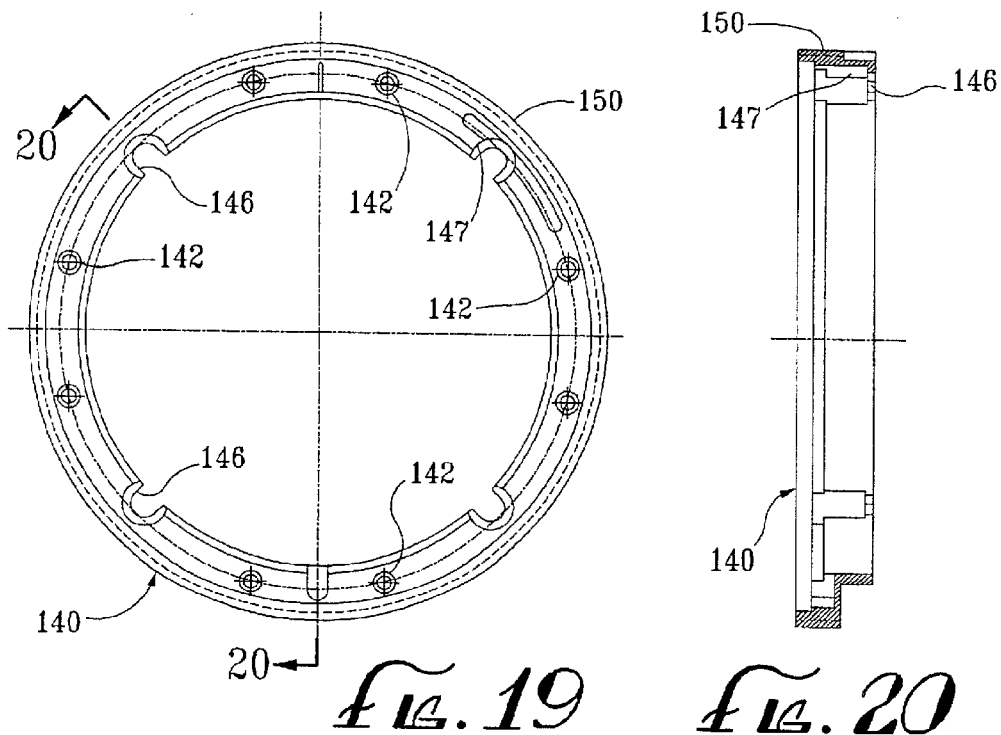
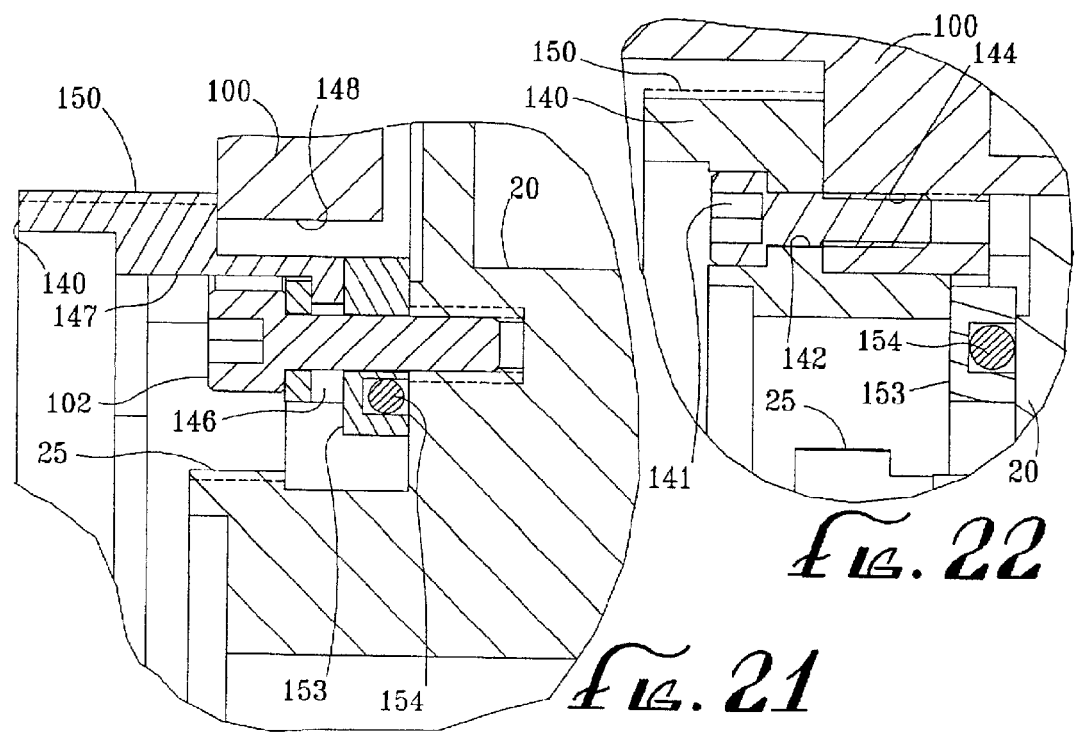

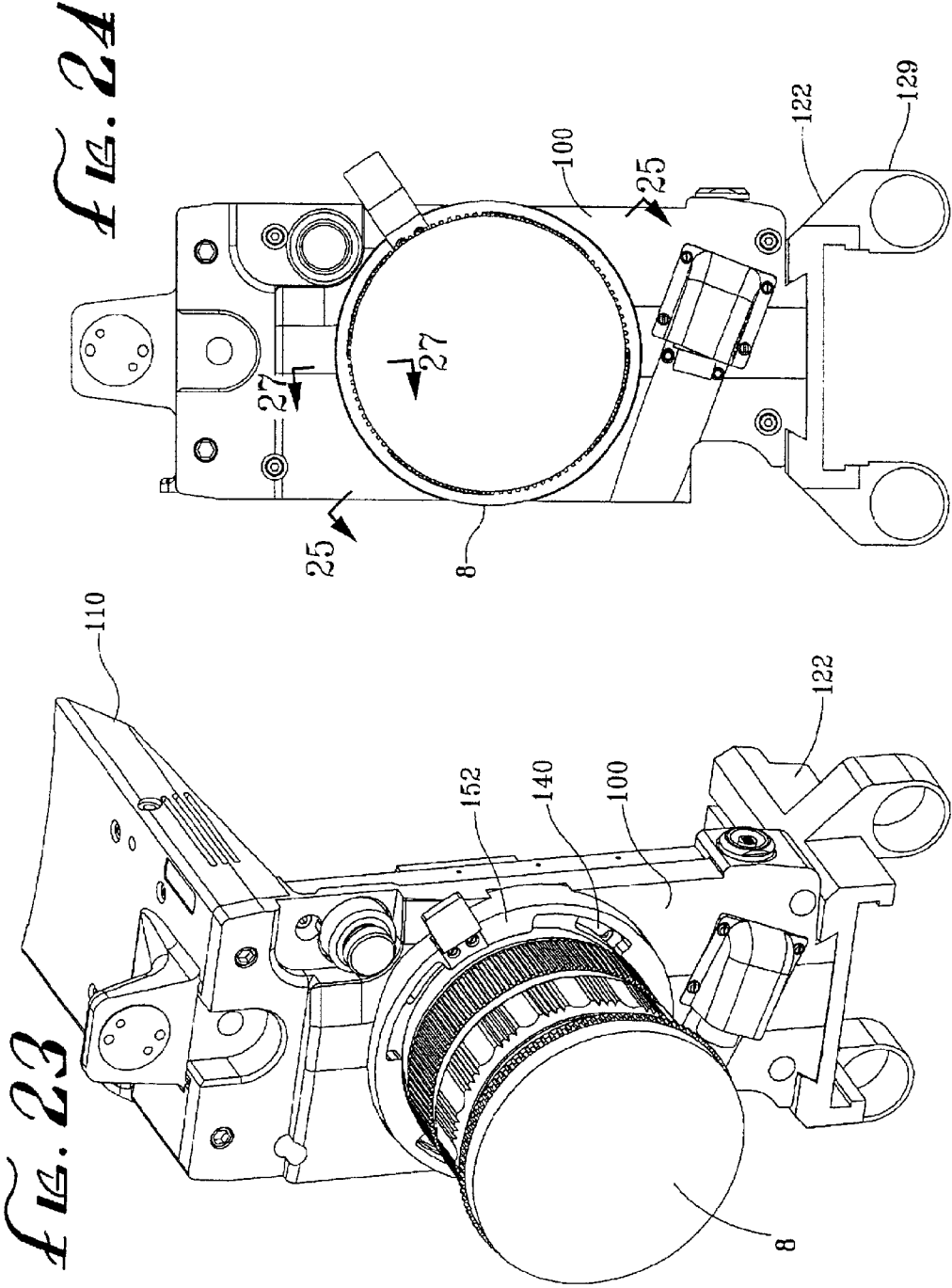

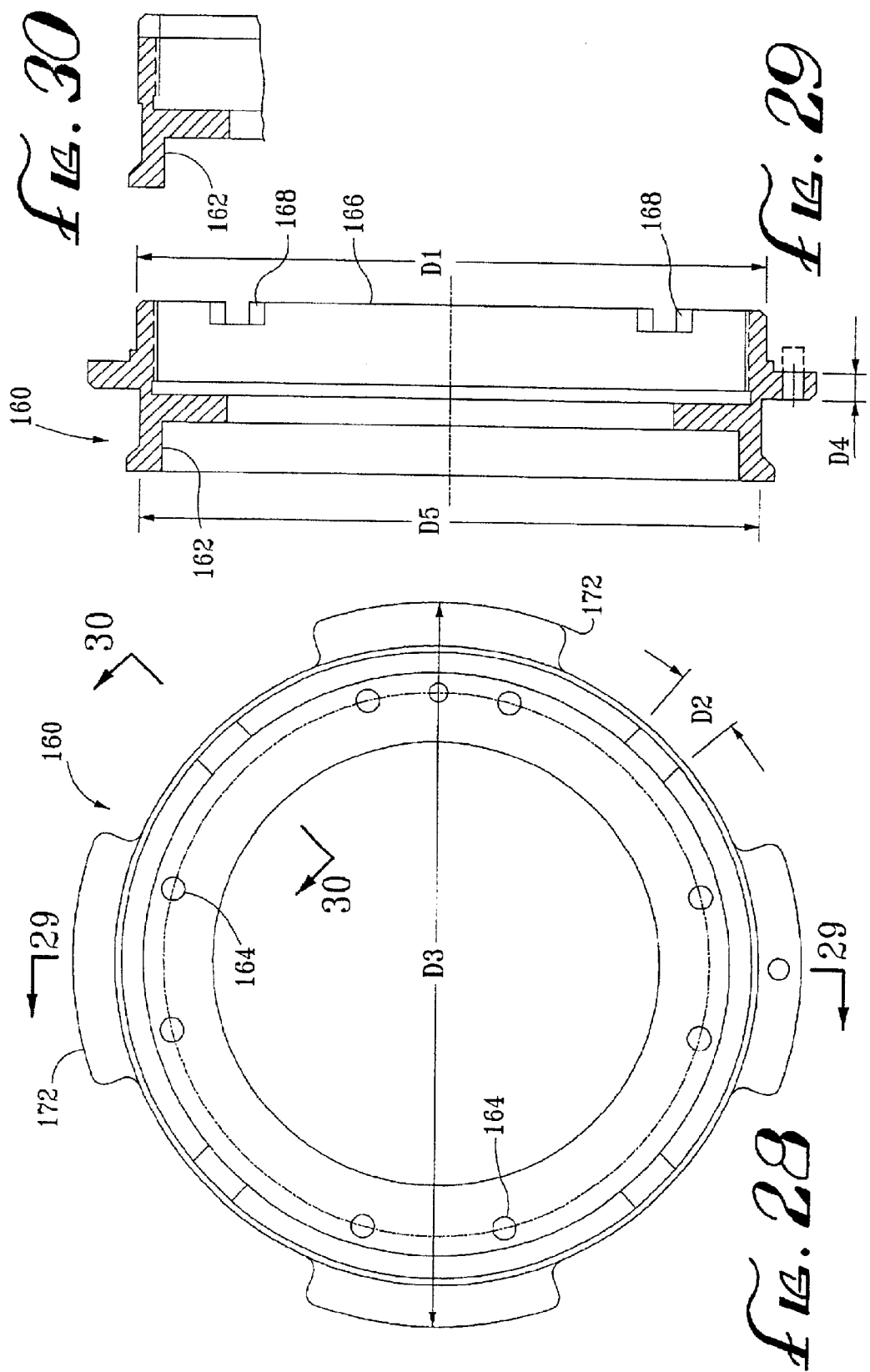

LENS MOUNT APPARATUS FOR A HIGH DEFINITION VIDEO CAMERA

The present invention relates to a lens mount apparatus for high definition video cameras and, in particular, to an apparatus that is added to a standard high definition video camera and provides a separate and independent lens mount for receiving interchangeable professional lenses.

Professional video cameras for electronic news gathering (ENG), for electronic field production (EFP) and for studio use require the use of different lenses, depending on the object to be photographed and the conditions, and therefore the ability to interchange lenses is important to the camera users. The increased use in professional video cameras of charge-coupled devices (CCD) which require more accurate mounting of the lenses with respect to the CCD devices, as compared to prior pickup-tube type video cameras, resulted in the adoption over ten years ago of an industry standard for the video camera lens mount (from those mounts available at the time) which standard is commonly known as the Canon B4 or Fujinon B type (hereinafter referred to as the "B4" mount). While the B4 lens mount has been satisfactory for replaceably accepting and supporting standard wide-angle zoom, standard zoom, and telephoto-zoom lenses used on video cameras for ENG, EFG and some studio uses over the years, the advent of high definition ("HD") television cameras and their use in high quality productions for television, as well as proposed uses with computer generated images ("CGI") and for cinema by transferring to film, has resulted in the need for using higher quality lenses on the HD video cameras, such as the Cine lenses commonly used on Cine film cameras. However, such Cine lenses normally have a lens mount housing or base larger than and different from the B4 mount and such lenses are normally of a larger diameter, length and weight than traditional video camera lenses and therefore the B4 lens mount and the video camera are not well suited for receiving the now-required higher quality lenses. It is not acceptable to merely use an adapter to convert the Cine lens housing mount to a B4 mount on the lens. For example, without limiting the scope of the invention described and claimed below, the B4 lens mount on the highly successful Sony HDWF-900 professional video camera cannot accept a lens weighing over 2.6 kg (5.73 lbs.) without potentially compromising the structural integrity of the camera, whereas a high quality Cine zoom lens can weigh as much as 25 lbs. Further, there are limitations concerning the location of the center of gravity of a lens for the B4 mount of the Sony HDWF-900 video camera that would prohibit the use of many standard Cine lenses. The HD video cameras of other manufacturers have similar structural limitations that preclude the direct use of Cine lenses normally used on Cine film cameras.

Another problem that has been encountered in attempting to adapt the HD video camera for high quality productions, CGI work and visual effects to be displayed on large TV or Cine screens is the dimensional tolerances that are permitted in the alignment of the CCD devices relative to the axis of the B4 lens mount. The conventional three-solid-state imager (3 different color CCDs) with the ⅔-in. optical image size format is positioned on the prism blocks and permanently assembled to the B4 lens mount at the factory with certain design allowances and tolerances. The design target for optical axis alignment between the lens port and the CCD imager is 0.5% of the diagonal of the imager and the industry standard tolerance is 0.04 mm (0.0015 in.) as the maximum misalignment allowable between the lens mount and the lens port. In the aggregate, these design tolerances allow the boresight or optical axis of the interchangeable lenses to be 0.095 mm (0.0037 in.) decentered with respect to the CCD image sensor, which distance can be in any direction. In terms of digital imaging, this maximum distance is about 19 pixels of misalignment, which may be electronically correctable or even acceptable for an ENG video camera, but for high quality image capture and visual effects work (CGI) it has been determined that any misalignment of more than two pixels (about 0.0004 in.) renders the metadata stream essentially useless.

Still another problem or challenge in adapting a HD video camera to accept high quality Cine lenses is that such lenses have several different configurations of the lens mount housings at the base of the lens for mounting on different film cameras whereby a single lens mount on the video camera will not accept all types of Cine lenses without modification. However, certain film directors, directors of photography, cameramen and others have specific preferences for specific lenses for particular applications whereby all such lenses should be capable of being properly mounted on the HD video camera.

Therefore, it is a principle object of the present invention to provide a novel lens mount apparatus for a video camera for removably supporting interchangeable lenses that are not supportable on the existing video camera lens mount. A further object of the present invention is to provide such a lens mount apparatus that supports interchangeable lenses of a size and/or weight that are not supportable on the existing video camera lens mount. A still further object of this invention is to provide such a lens mount apparatus as an addition to the existing video camera lens mount whereby two independently usable lens mounts are provided on the video camera for accepting a variety of lens mount housings.

Another principle object of this invention is to provide a lens mount apparatus that supports the conventional video camera lens mount and image sensor combination unit in an adjustable manner for accurately aligning the axis of the image sensor with the axis of the inventive lens mount apparatus. A further object of this invention is to provide such a lens mount apparatus wherein the image sensor is aligned on the optical axis of the lens mount apparatus without regard for the location of the optical axis of the existing video camera lens mount. A still further object of this invention is to provide such a lens mount apparatus for adjustably supporting the combined video camera lens mount and image sensor for accomplishing optical alignment between lenses and the image sensor without modifying the existing video camera lens mount and image sensor. Still a further object of this invention is to provide such a lens mount apparatus having a lens mount housing attachable to a conventional lens for adapting that conventional lens to be replaceably mounted in the lens mount apparatus without interfering with the existing video camera lens mount.

Other and more detailed objects and advantages of the present invention will appear to those skilled in the art from the following description of a preferred embodiment of the invention in connection with the accompanying drawings, wherein:

FIGS. 5, 6 and 7 are perspective views of the lens mount apparatus of the present invention separated from the video camera and illustrating the apparatus with the lens lock rings removed (FIG. 5), with the lens lock ring of the lens mount apparatus of the present invention in place (FIG. 6), and with the lens lock ring of the existing video camera lens mount in place (FIG. 7);

FIG. 19 is a front elevation view of the support ring component of the lens mount apparatus of the present invention;

FIG. 20 is a sectional view of the support ring taken substantially on the line 20—20 in FIG. 19;

FIG. 21 is a fragmentary sectional view taken substantially on the line 21—21 in FIG. 4 for illustrating the attachment of the existing video camera lens mount to the support ring of the lens mount apparatus of the present invention;

FIG. 22 is a fragmentary sectional view taken substantially on the line 22—22 in FIG. 4 for illustrating the mounting of the support ring of the lens mount apparatus of the present invention on the face plate component thereof;

FIG. 23 is a perspective view of the lens mount apparatus of the present invention without the video camera and illustrating a conventional cine lens adapted for and mounted thereon;

FIG. 24 is a front elevation view of the lens mount apparatus and the conventional lens shown in FIG. 23;

FIG. 28 is a front elevation view of the lens mount housing of the present invention for attaching to the back of a conventional lens for then mounting the lens in the lens mount apparatus of the present invention as shown in FIGS. 23–27;

FIG. 29 is a sectional view taken substantially on the line 29—29 in FIG. 28 showing the lens mount housing; and FIG. 30 is a fragmentary sectional view taken substantially on the line 30—30 in FIG. 28.

Figure 1:
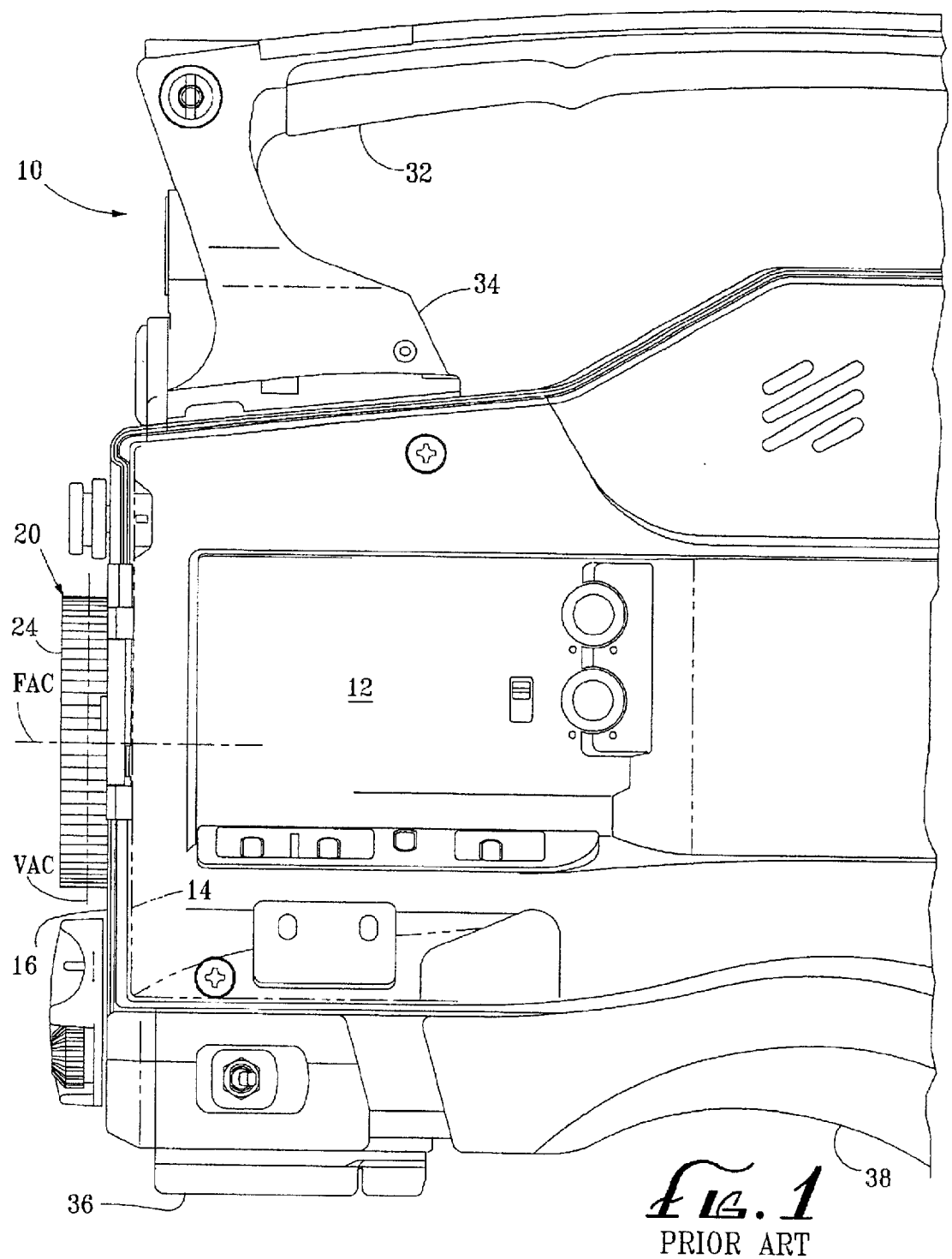
FIG. 1 is a side elevation view of the front portion of a typical conventional HD video camera, such as a Sony HDWF-900 video camera.
Figure 2:
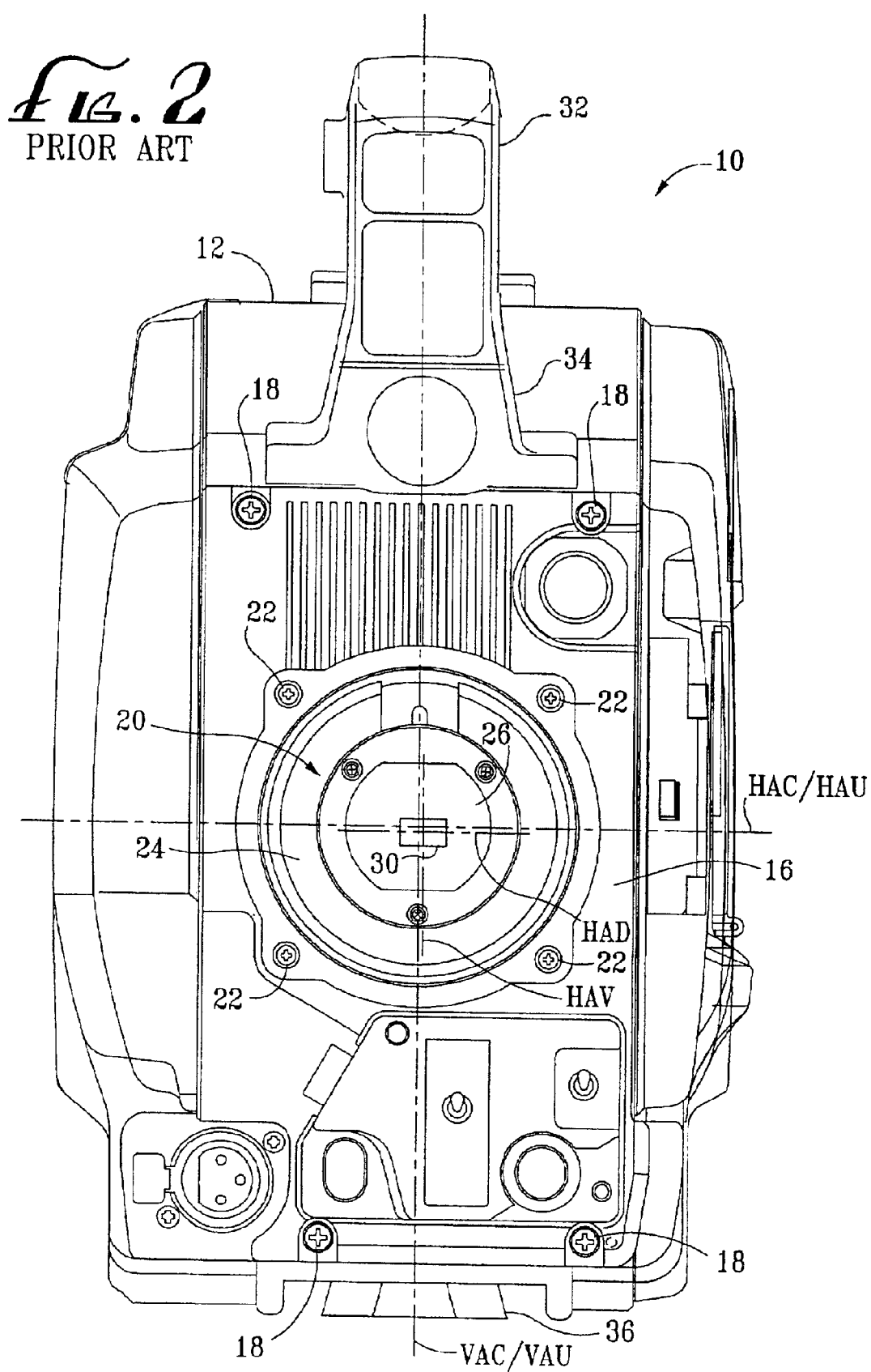
FIG. 2 is a front elevation view of the video camera shown in FIG. 1 without a lens or cover for thereby illustrating the relative location of the image sensor.

Referring now to FIGS. 1 and 2, a conventional professional video camera 10, such as a Sony HDWF-900 model, is shown for illustrating how the present invention is used for modifying a professional video camera but it will be readily understood by those skilled in the art that the present invention is equally applicable to other types and models of professional video cameras. The camera 10 has a body 12 with a front mounting surface 14 on which a face plate 16 is mounted by, for example, four machine screws 18. The camera 10 is provided with a combination video lens mount and image detector unit, generally designated 20, that is mounted on the inside of the face plate 16 by, for example, four machine screws 22. The combination unit 20 is comprised of the lens mount 24 and the image detector device 26 which are precisely and permanently assembled at the factory by conventional means whereby the lens mount 24 and image detector device 26 cannot be separated or adjusted with respect to each other. This serves to maintain the proper axial spacing between the lens mount 24 and the three CCDs 30, as well as the axial or boresight alignment as precisely as possible under manufacturing conditions and tolerances. However, as noted above in discussing the problems with the prior art professional video cameras, the CCDs 30 of the image detector device 26 may be misaligned or decentered from the axis of the lens mount 24 by as much as 0.095 mm (0.0037 in.) as produced in the factory. For convenience of the illustration, this decentering or misalignment has been exaggerated in FIG. 2 to show the centerline of the CCDs 30 below and to the right of the centerline of the lens mount and camera. Specifically, the horizontal centerline or axis HAD of the CCDs 30 of the image detector device 26 is below the horizontal centerline or axis HAC of the camera 10 and face plate 16, which is also the location of the horizontal axis or centerline HAU of combination unit 20 in the prior art assembly. Similarly, the vertical centerline or axis VAD of the CCDs 30 of the image detector device 26 is to the right of the vertical centerline or axis VAC of the camera 10, face plate 16, which is also the location of the vertical axis or centerline VAU of combination unit 20 in the prior art assembly. Thus, a lens mounted on the B4 lens mount 24, which is aligned with the axes HAC/HAU and VACNAU will be decentered from the CCDs 30 of image detector device 26 which is permanently located on the decentered axes HAD and VAD. The fore and aft axis FAC of the camera representing the intersection of the horizontal axis HAC and the vertical axis VAC is shown in FIG. 1 and constitutes the centerline of the B4 lens mount 24. Again, as noted above, this decentering has been acceptable for most uses of professional video cameras but for modern high quality image capture and visual effects work (CGI) it is unacceptable and is solved by the present invention as described below.

Before describing the present invention, additional structural features of camera 10 that relate to the invention will be described. The conventional camera 10 is provided with a handle 32 with a front base 34 that is mounted to the top of the camera body 12 by four machine screws (not shown in FIGS. 1 and 2). The video camera 10 also is provided with a dovetail mount 36 connected to the bottom of camera body 12 by four machine screws (not shown) for mounting the camera 10 on a tripod or any other support device in a conventional manner. The camera 10 is provided with a shoulder pad 38 for supporting the camera 10 on the shoulder of a cameramen for use in a portable mode. Further, the video camera 10 is provided with all of the conventional controls and accessories that will remain following the modification of the camera 10 in accordance with the present invention and therefore will not be described.

In summary, it should be noted that as viewed in FIG. 2 the conventional face plate 16, the combination unit 20 mounted by the four screws 22 to the back of the face plate 16, and the B4 lens mount 24 of the combination unit 20 are all centered on the axes HAC/HAU, VACNAU and FAC, whereas the CCDs 30 of the image detector device 26 are the only items that are misaligned or decentered, that is, the CCDs 30 are aligned on the axes HAD and VAD rather than axes HAC/HAU and VACNAU where ideally they would be located, but for manufacturing inaccuracies and tolerances.

Figure 3:
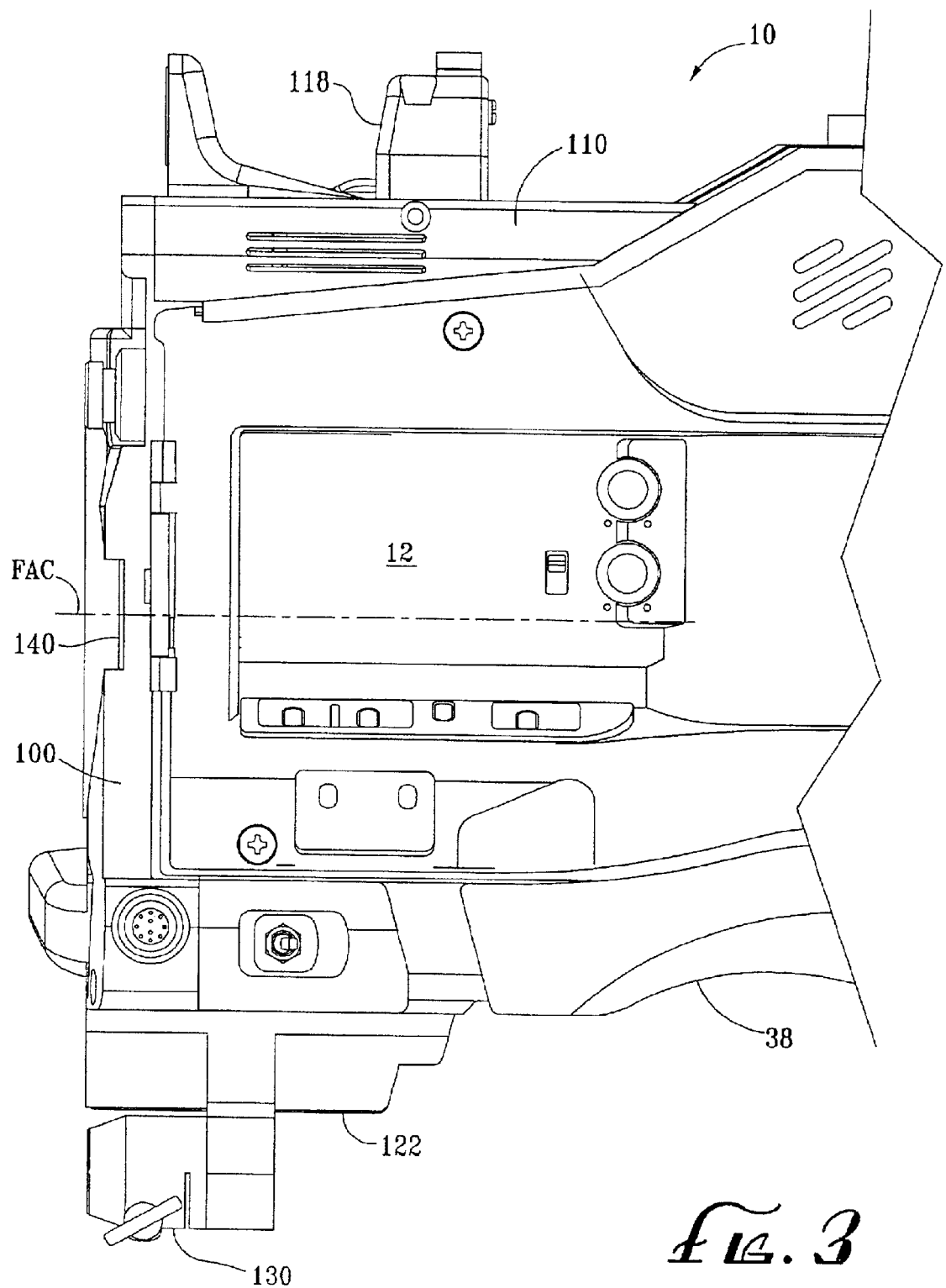
FIG. 3 is a side elevation view of the video camera illustrated in FIG. 1 but with the lens mount apparatus of the present invention mounted on the face, top and bottom of the video camera.
Figure 4:
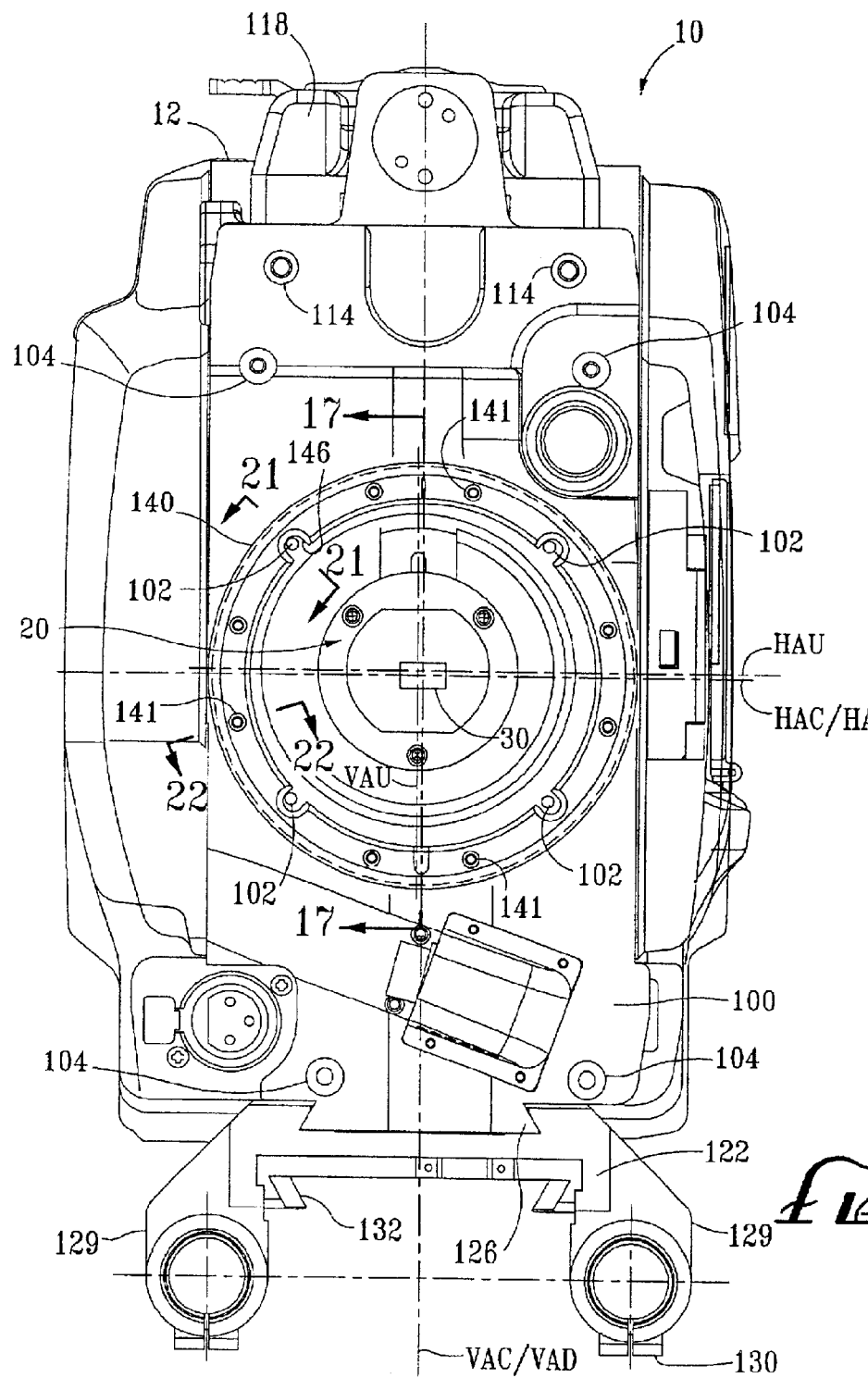
FIG. 4 is a front elevation view similar to FIG. 2 but with the lens mount apparatus of the present invention positioned on the video camera as shown in FIG. 3.
Figure 8:
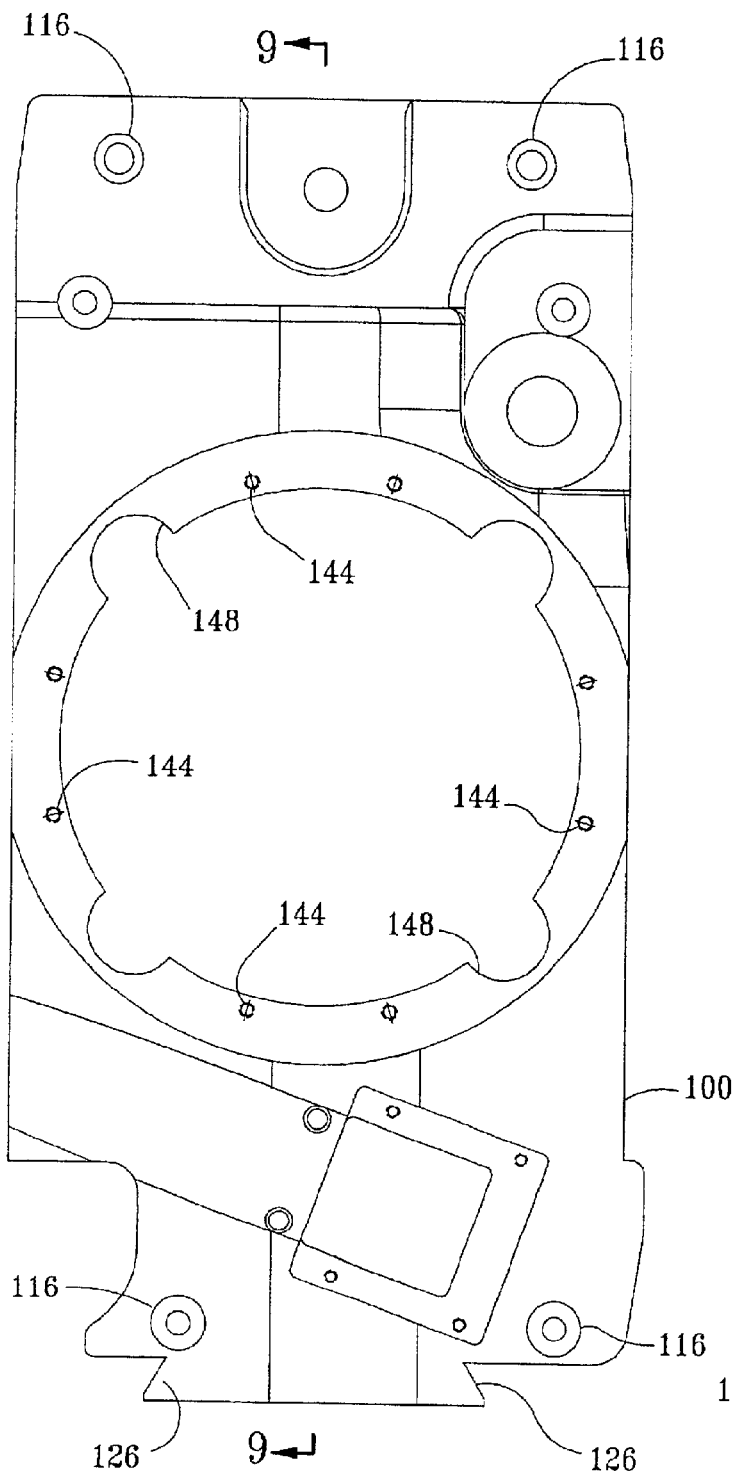
FIG. 8 is a front elevation view of the replacement face plate component of the lens mount apparatus of the present invention.
Figure 9:
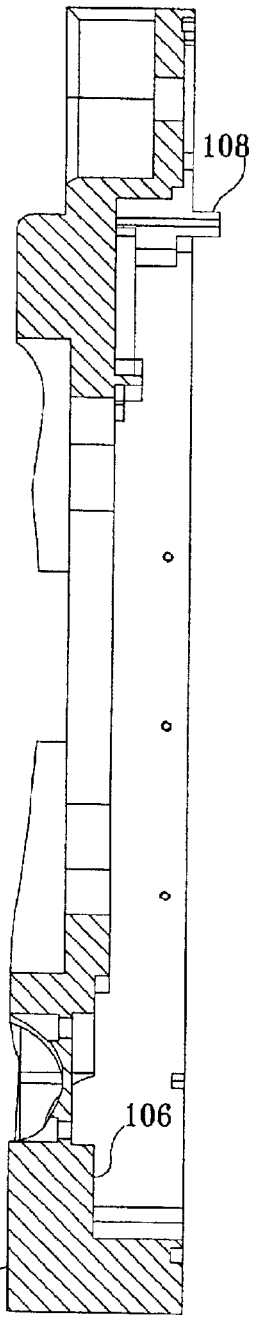
FIG. 9 is a sectional view taken substantially on the line 9—9 in FIG. 8 of the face plate component.
Figure 10:
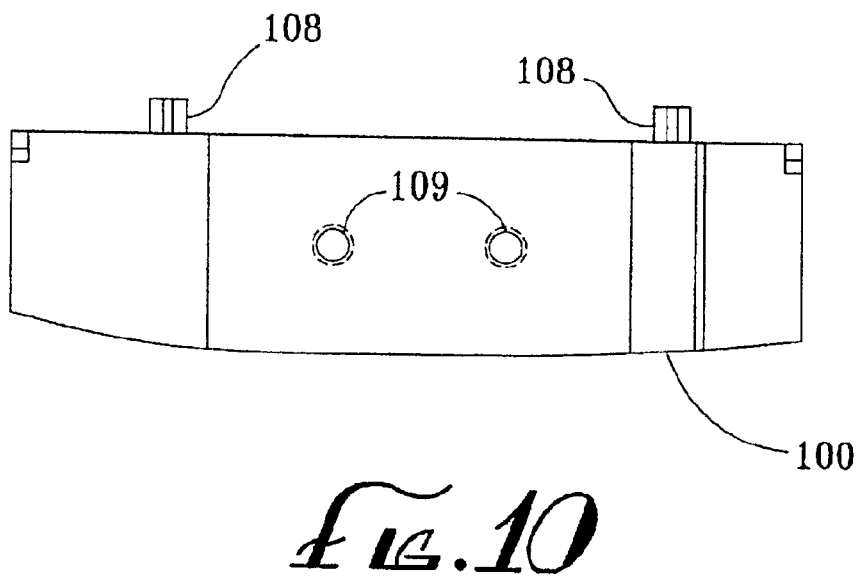
FIG. 10 is a bottom view of the face plate component illustrated in FIGS. 8 and 9.

Referring now to FIGS. 3 and 4 that correspond to FIGS. 1 and 2, respectively, but illustrate the present invention, for consistency and convenience of description, those components or characteristics described above with respect to FIGS. 1 and 2 that remain the same in the present invention as hereinafter described will be identified by the same numeral and their description will not be repeated, except where necessary for an understanding of the present invention. For the adaptation of the present invention, the face plate 16 of the conventional professional video camera 10 is removed by removing the four machine screws 18 shown in FIG. 2 and then removing the combination lens mount and image detector unit 20 from the back of the face plate 16 by removing the four machine screws 22. A lens support ring 140 (also see FIGS. 19–22 and detailed descriptions thereof below) is mounted on the front of face plate 100 by eight machine screws 141. The conventional combination unit 20 is then installed on the back of a lens support ring 140 and extends behind replacement face plate 100 (also see FIGS. 8, 9 and 10) by the use of four machine screws 102 (only the shanks of which are shown in FIG. 4 for illustration purposes), which are positioned in the same bolt pattern and may be the same as conventional machine screws 22. As an alternative, the replacement face plate 100 may be provided with integral portions having all of the functional features of the lens mount support 140, whereby the combination unit 20 would be mounted directly to the back of face plate 100. The replacement face plate 100 then may be installed on the camera body 12 by the use of four machine screws 104 in the same bolt pattern as machine screws 18 shown in FIG. 2. It should be noted that the face plate 100 is substantially thicker than the face plate 16, which may be observed by comparing FIGS. 1 and 3, for providing greater structural support for the interchangeable lenses and replacement face plate 100 extends upwardly and downwardly beyond where conventional face plate 16 extended. The inner surface 106 of the face plate 100 is shaped to fit the front mounting surface 14 of the camera body 12 in the same manner as the face plate 16 fits the camera body 12.

Figure 11:
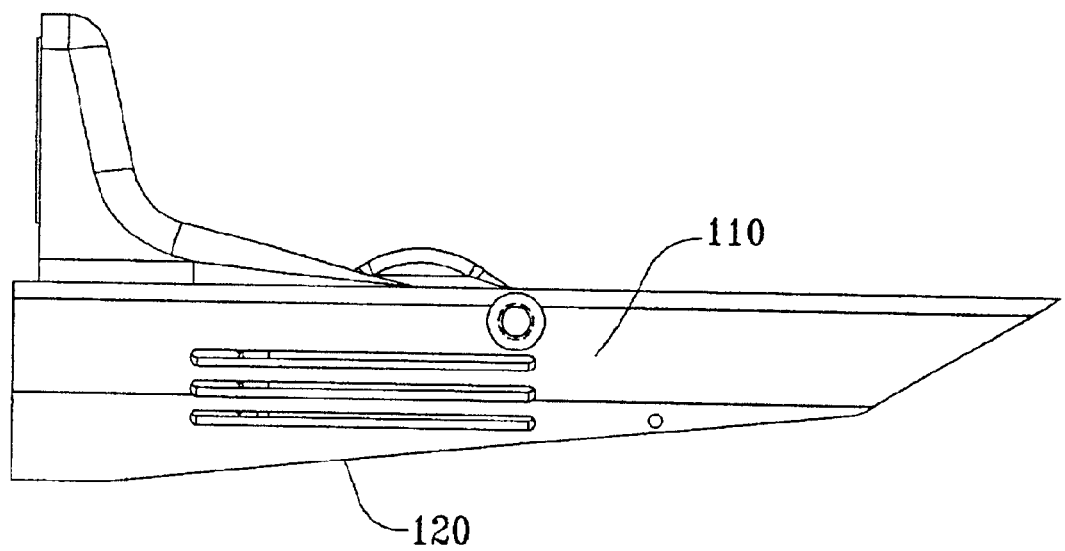
FIG. 11 is a side elevation view of the top plate component of the lens mount apparatus of this invention.
Figure 12:
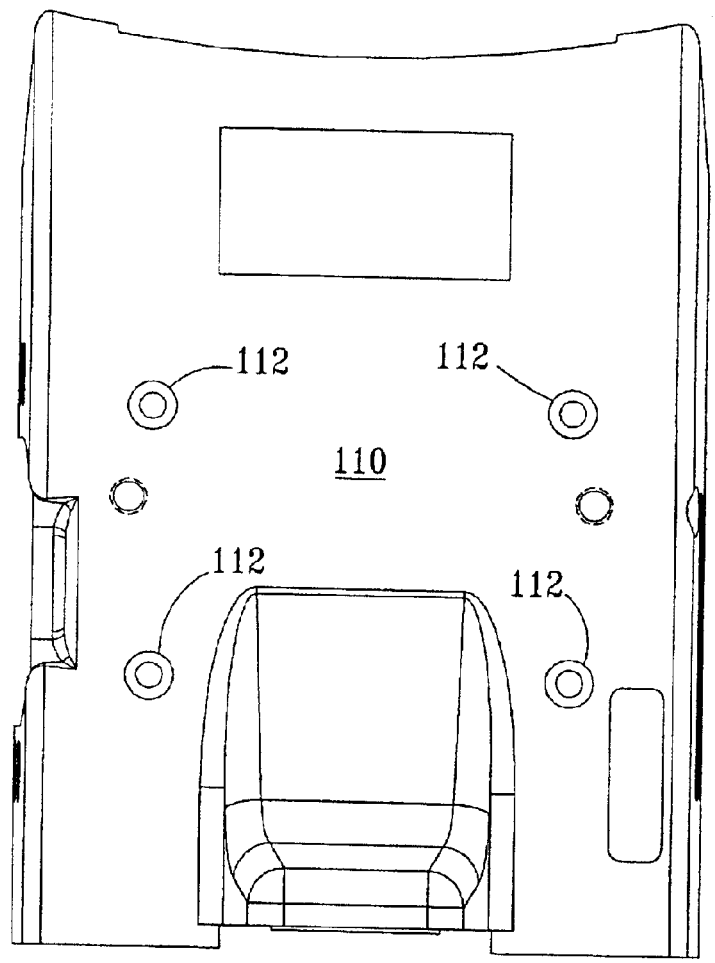
FIG. 12 is a top plan view of the top plate component of the lens mount apparatus of the present invention.
Figure 13:
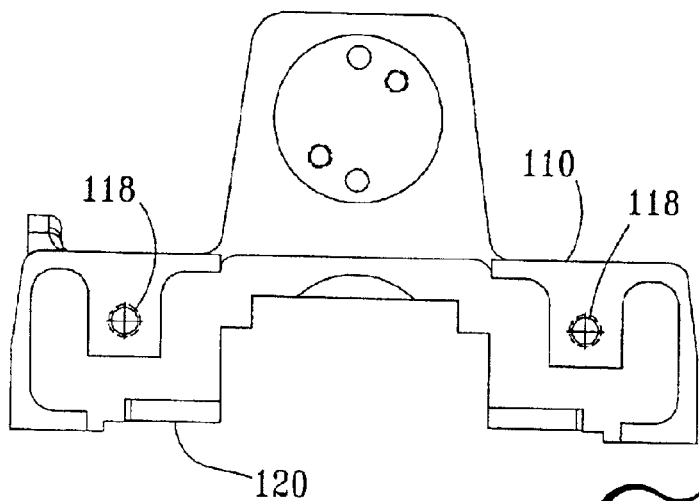
FIG. 13 is a front elevation view of the top plate component of the lens mount apparatus of the present invention.

A top plate 110 (also see FIGS. 11, 12 and 13) is positioned on the top, front portion of the camera body 12, after the conventional handle 32 and front handle base 34 are removed from the camera body, and four machine screws (not shown) are installed through the four holes 112 in top plate 110 to threadedly engage the four holes in the camera body 12 that are conventionally used for mounting the front handle base 34 on the camera body 12. Two machine screws 114 extend through holes 116 in the top portion of replacement face plate 100 and threadedly engage holes 118 in the top plate 110 to structurally join the face plate 100 to the top plate 110. Further, the face plate 100 is provided two guides 108 near the top of the face plate 110 which align with a rib in the top portion of camera body 12 for enhancing the structural connection between the face plate and camera body 12. A front handle base 118 is mounted on the top of top plate 110 for connecting a substitute handle (not shown) over the top of the camera body 12. The bottom surface 120 of the top plate 110 is shaped to fit the corresponding top surface portion of the camera body 12 for enhancing the structural connection therebetween.

Figure 14:
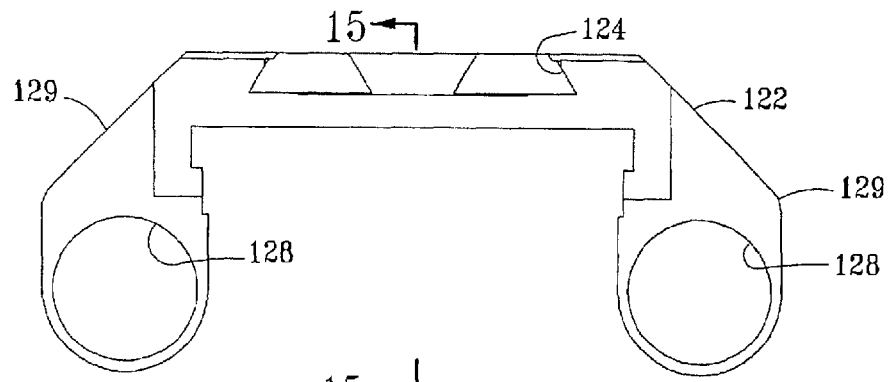
FIG. 14 is a front elevation view of the bottom plate component of the lens mount apparatus of the present invention.
Figure 15:
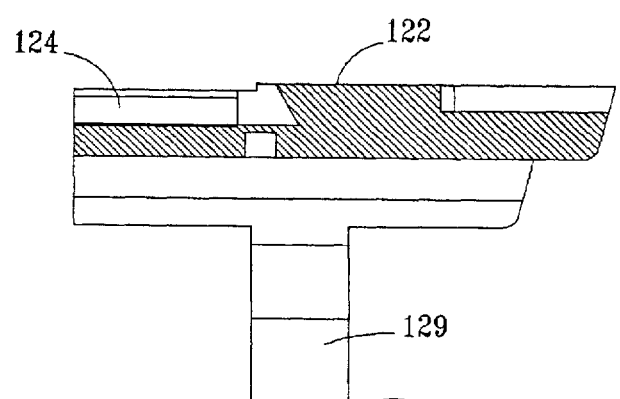
FIG. 15 is a sectional view taken substantially on the line 15—15 shown in FIG. 14.
Figure 16:
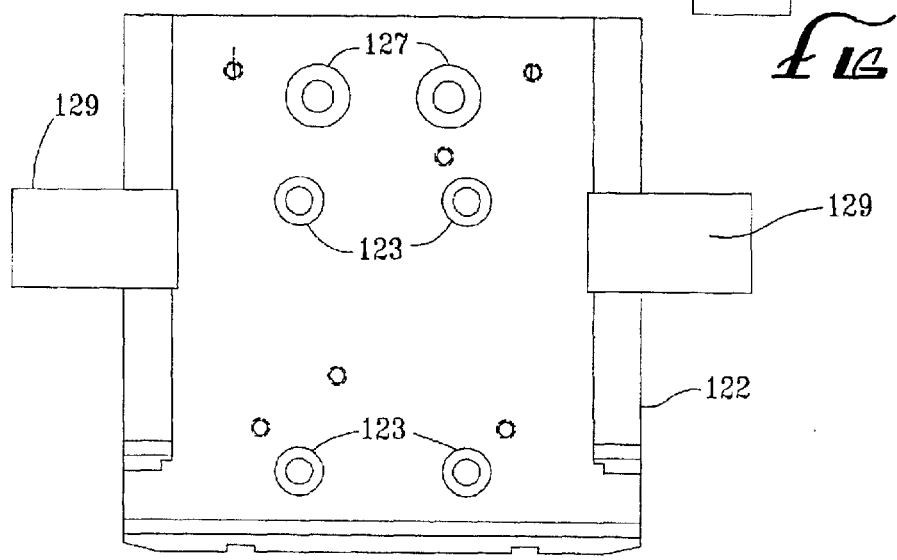
FIG. 16 is a bottom view of the bottom plate component of the lens mount apparatus of the present invention.

A bottom plate 122 (also see FIGS. 14, 15 and 16) is provided on the bottom of the camera body 12 for further enhancing the structural connection between the face plate 100 and the camera body 12. The bottom plate 122 has four holes 123 through which four machine screws are inserted for connecting the plate 122 to the camera body 12 after the camera dovetail mount 36 is removed by removing four machine screws having the same bolt pattern. The bottom plate 122 has a dovetail slot 124 that fits over a dovetail portion 126 on the bottom edge of the face plate 100. Two machine screws (not shown) extend through holes 127 in the bottom plate 122 and threadedly engage two holes 109 in the face plate 100 for enhancing the structural integrity. The bottom plate 122 is provided with a pair of downwardly extending arms 129 having horizontal holes 128 therethrough for receiving iris rod mounting devices 130 (see FIGS. 3 and 4) which in turn receive a pair of iris rods that extend forwardly of the camera 10 for supporting various accessories, such as a matte box, that are commonly used in cinematography but were less frequently used previously in video taping. Also, a dovetail mechanism 132 may be provided on the bottom of the bottom plate 122 for in turn mounting the camera on a tripod or other camera support device.

Referring now to FIGS. 5, 6 and 7, the face plate 100, top plate 110 and bottom plate 122 are shown in the assembled condition separate from the video camera 10 and illustrate the structural arrangement that sits over the front, top and bottom, respectively, of the video camera for enhancing the structural strength for supporting longer and heavier lenses, such as Cine zoom lenses, that are not otherwise supportable on the face plate 16 of the conventional video camera 10. This structure does not interfere with any of the conventional controls and operations of the camera 10 and provides most of the conventional mounting locations on the face plate 100 for the same components, although some locations are changed for added convenience that are or may be provided on the front of the conventional video camera 10, which can be observed by comparing these three figures and FIG. 4 with FIG. 2,. FIGS. 5, 6 and 7 also illustrate three different conditions of the lens mounting arrangement that will be described more fully below.

Referring again to FIG. 4 and more particularly to FIGS. 8 and 19–21, the lens mount arrangement and CCD imager alignment feature of the present invention will be described. By the present invention, an additional lens mount is provided that is larger in diameter and stronger than the B4 lens mount 24 but without preventing the use of conventional video lenses on the B4 lens mount. A lens support ring 140 (see FIGS. 19 and 20) of an inside diameter larger than the components of the conventional B4 lens mount 24 is mounted on the replacement face plate 100 by eight small screws 141 passing through the eight holes 142 in ring 140 and threadedly engaging the eight threaded holes 144 in the face plate 100 to securely mount the ring 140 in a centered position with respect to the face plate 100 and the camera axes HAC, VAC and FAC. As noted previously, ring 140 is installed on face plate 100 before the combination unit 20 is installed on the back of the ring 140 with the four machine screws 102 and before the face plate 100 is installed on the face of the camera 10 by the four machine screws 104. The ring 140 is provided with four unshaped slots 146 that open toward the center of the ring, which slots are at the location of the four screws 102 but are wider than the diameter of the screws 102, as best shown in FIG. 4. Also, the face plate 100 is provided with four oversized slots 148 beneath the locations of the slots 146 for accommodating and not obstructing the screws 102. The support ring 140 is provided with an external thread 150 on which a lens lock ring 152 is threadedly mounted for completing the lens mount arrangement.

As noted above in describing the assembly of the replacement face plate 100, lens support ring 140 and the combination unit 20 comprising the B4 lens mount 24 and the image detector device 26 having the three CCDs 30, the combination unit 20 is secured to the back of the lens support ring 140 behind the face plate 100 by the screws 102. By virtue of the enlarged slots 146, the combination unit 20 may be shifted vertically and horizontally, as well as rotationally, about the fore and aft axis FAC of the camera 10 and face plate 100 before the four machine screws 102 are tightly secured. Thus, by using a conventional boresight alignment apparatus (not shown) mounted on the lens support ring 140, which apparatus is thereby aligned with the lens port formed by the ring 140, the combination unit 20 may be moved appropriately to align the CCDs 30 with the axis of the lens support ring 140 which in turn is aligned with the camera axes HAC, VAC and FAC as shown in FIG. 4. In other words, from the position shown in FIG. 2 where the axes HAU and VAU of the combination unit 20 and the B4 lens mount were aligned with the camera axes HAC and VAC, the horizontal centerline or axis HAU of the unit 20 moves upwardly and the vertical centerline or axis VAU moves to the left for the unit 20 to become decentered upwardly and to the left with respect to the camera centerlines or axes HAC and VAC, as best shown in FIG. 4, while of course the lens support ring 140 remains centered on the camera 10 and face plate 100 axes HAC and VAC. In other words, axes HAC and HAD become coincident as do axes VAC and VAD, as shown in FIG. 4. This decentering of the combination unit 20 with respect to the support ring 140 may also be observed by the locations of the machine screws 102 within the slots 146 of ring 140; that is, the screw 102 in the upper left quadrant is at the base of the slot 146, the screw 102 in the lower right quadrant is spaced from the base of the slot 146, and the screws 102 in the lower left and upper right quadrants are moved upwardly and leftwardly to the edge of the slots 146. By this arrangement, lenses mounted on the lens support ring 140 are precisely and accurately centered on the axis of the CCDs 30 for providing precisely centered images that are reproducible and compatible with Cine film applications and visual effects work (CGI). Of course, the misalignments of the CCDs 30 with respect to the other axes is exaggerated in those figures for purposes of illustration and normally the maximum misalignment in any one direction would be about 0.095 mm (0.0037 in.), which distance would not be visible in the Figures but would render the images useless for high quality Cine productions and special effects work.

Figure 17:
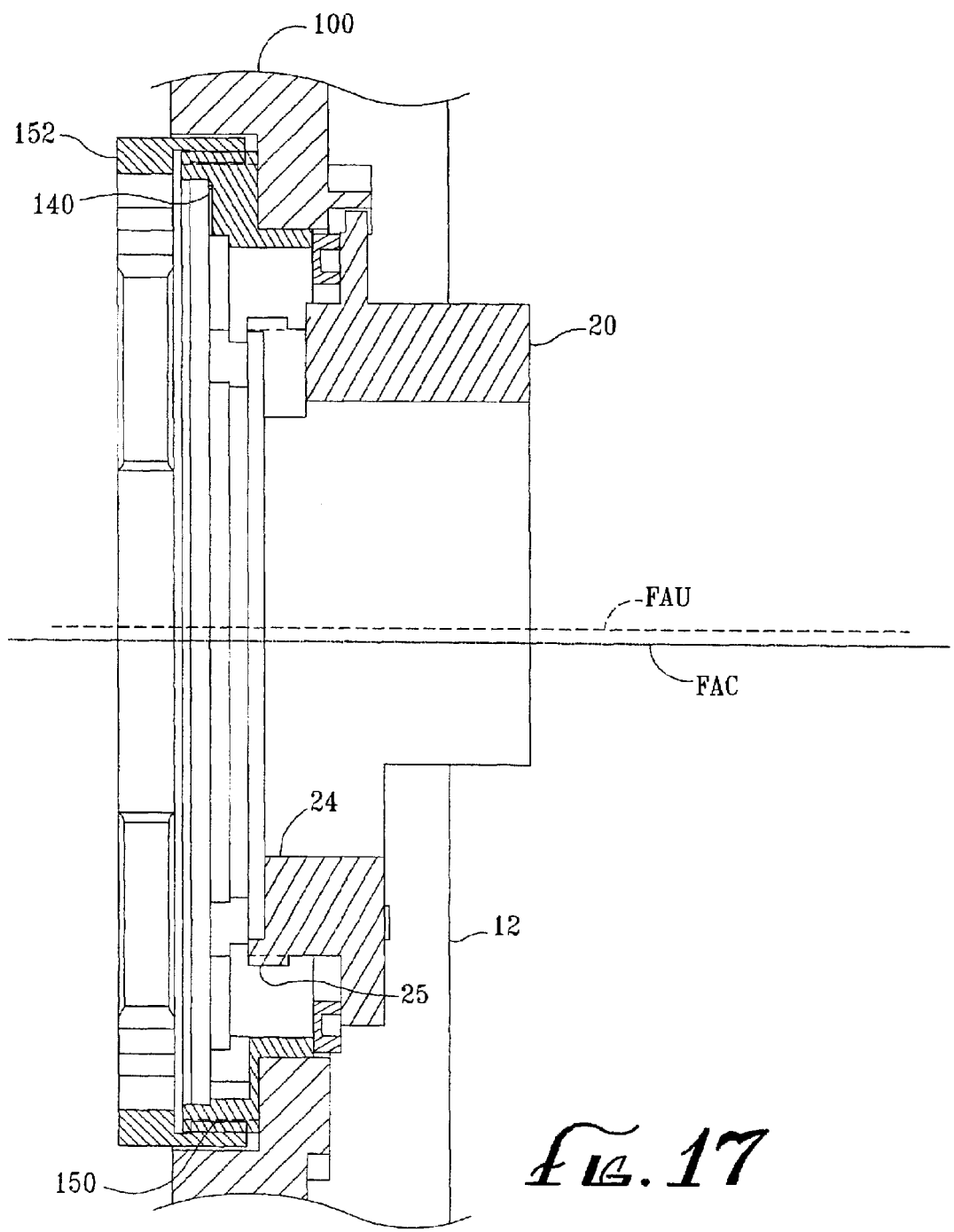
FIG. 17 is a fragmentary sectional elevation view of the lens mount apparatus of the present invention taken substantially on the line 17—17 in FIG. 4.
Figure 18:
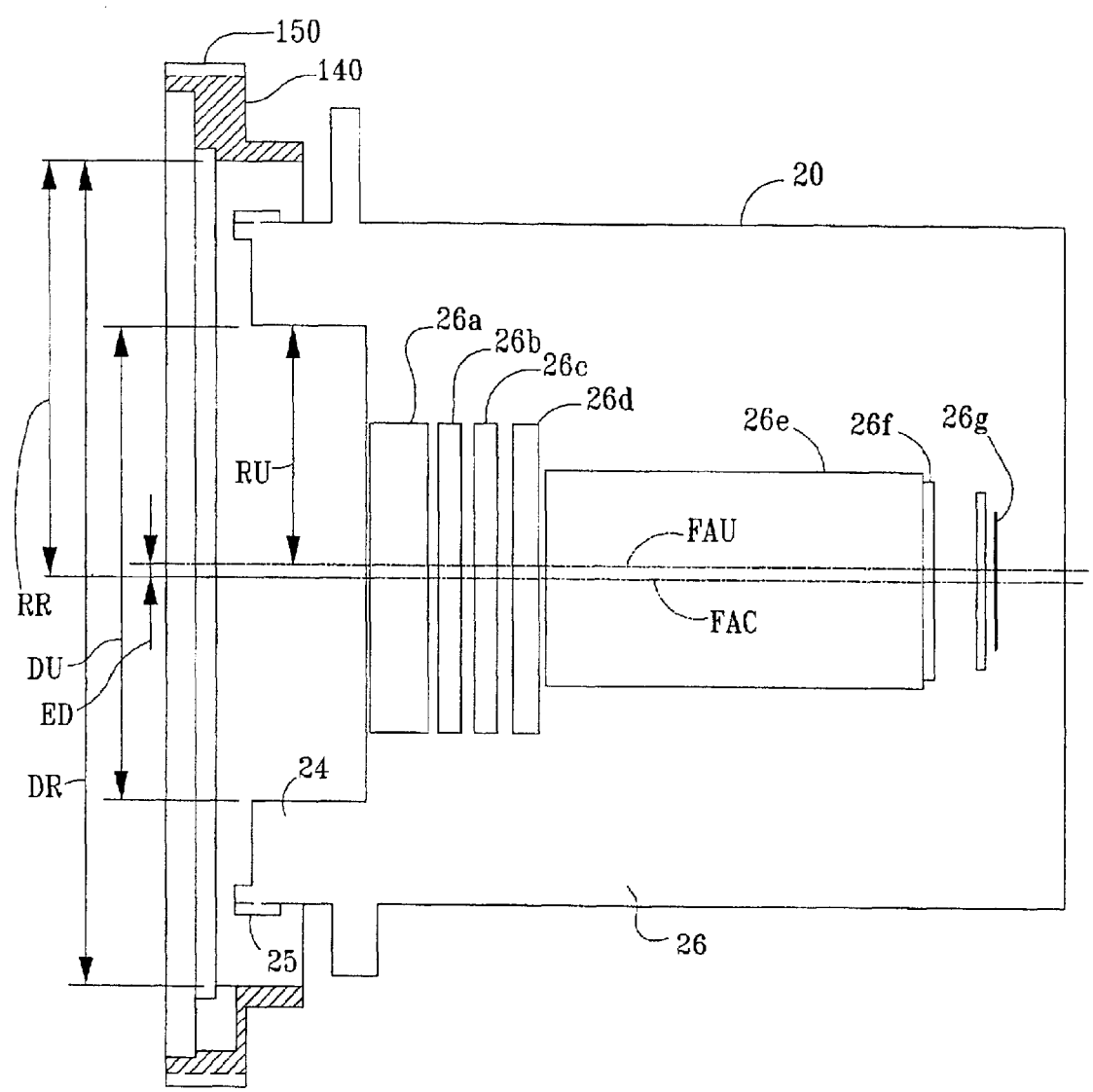
FIG. 18 is a diagrammatic view similar to FIG. 17 for illustrating the relationship of the lens mount apparatus of the present invention, the conventional video camera lens mount, and the image sensor of the video camera.
Figure 25:
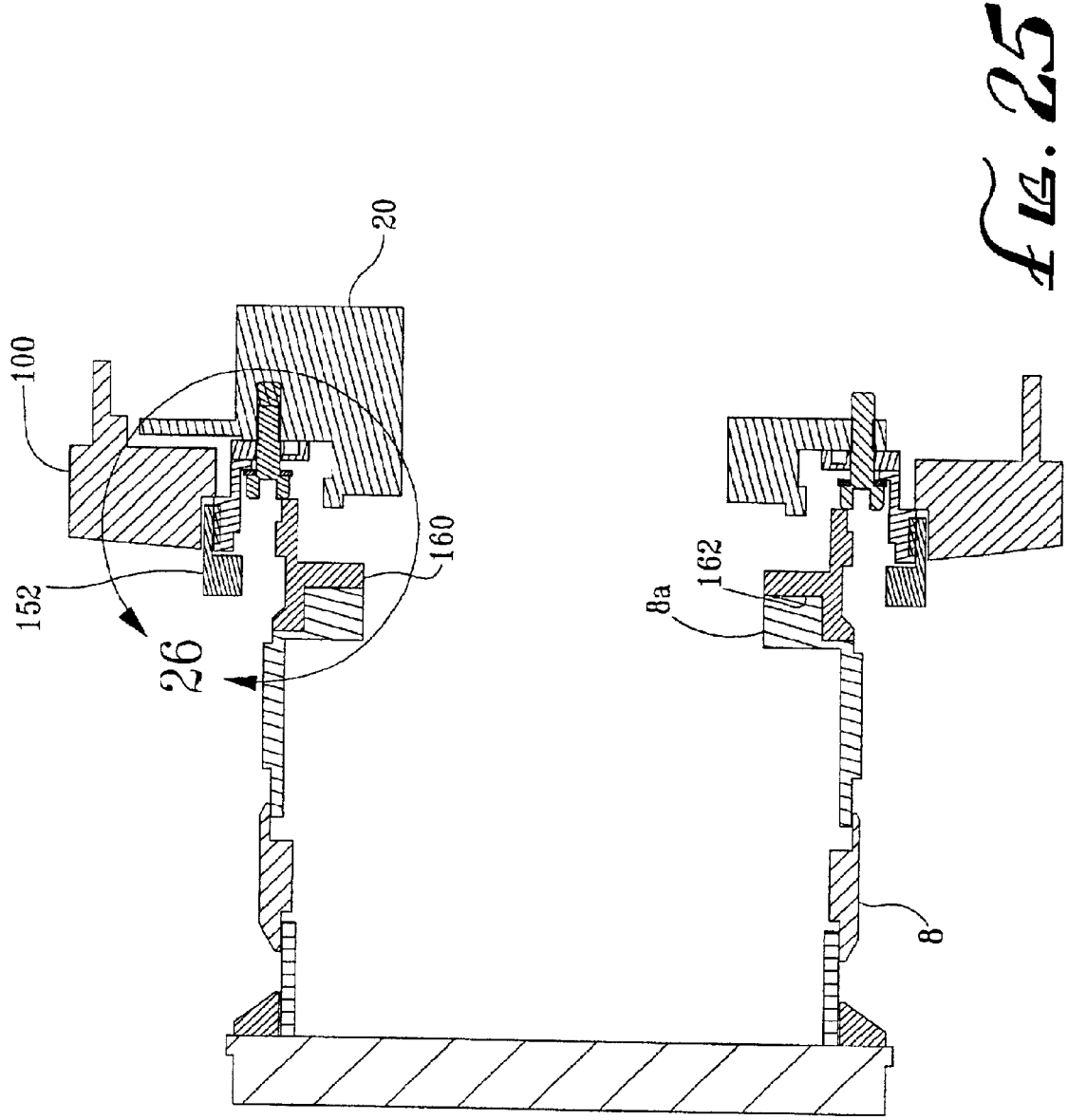
FIG. 25 is a sectional view taken substantially on the line 25—25 shown in FIG. 24 for showing the mounting of the conventional cine lens with an adaptive lens mount housing of the present invention.
Figure 27:
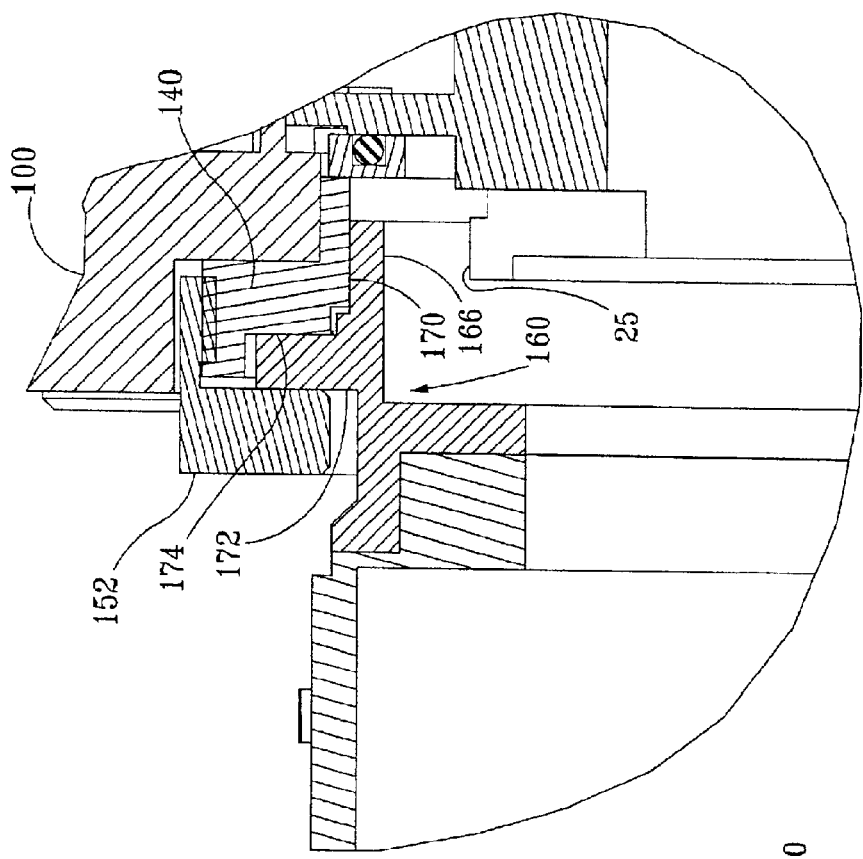
FIG. 27 is a fragmentary sectional view similar to FIG. 26 but taken substantially on the line 27—27 shown in FIG. 24.
Figure 26:
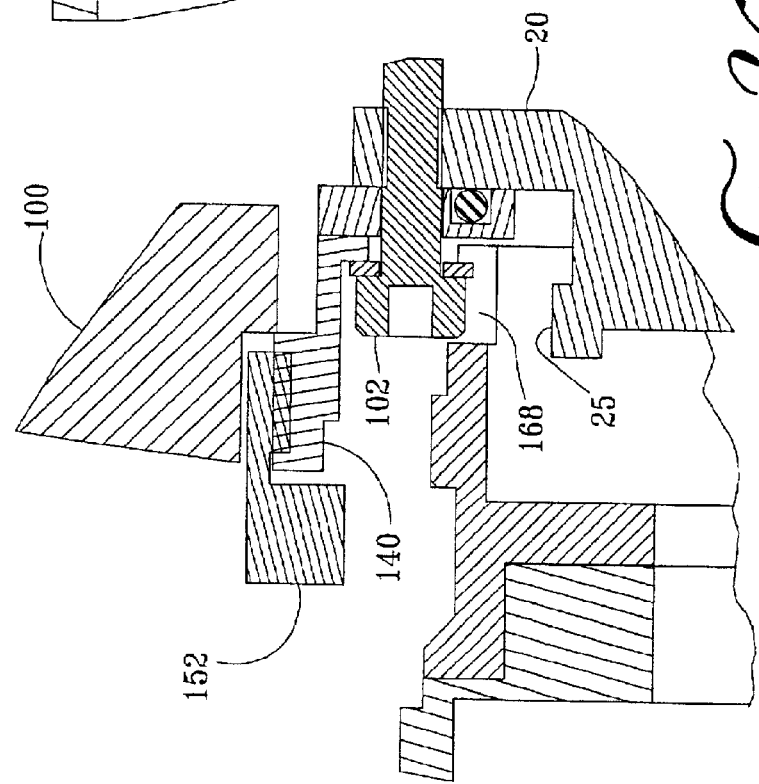
FIG. 26 is an enlargement of a portion of FIG. 25 as shown by the circle 26 in FIG. 25.

By way of further explanation of the alignment of the CCDs 30 with the axis of the support ring 140 for in turn aligning any lens mounted on the support ring 140 with the axis of the CCDs 30, reference is made to FIGS. 17 and 18 which are diagrammatic elevation views of the lens mount region of the camera. The external thread 25 provided on the combination unit 20 for forming the B4 mount 24 has a central or fore and aft axis FAU which is positioned above the central axis FAC of the camera 10 and the additional lens mount formed by lens support ring 140 and lock ring 152 after the position of the combination unit 20 has been adjusted upwardly and to the left (as shown in FIG. 4) in the aforedescribed manner. All of the components of the combination unit 20 remain in the same relative position and, for example, a diameter DU of the combination unit 20 is still twice a radius RU. However, the image detector device 26 having conventional devices such as a low pass filter 26a, color filter 26b, neutral density filter 26c, glass 26d, prisms 26e, trim filter 26f and the CCDs 30 at the image plane 26g are located on an axis that may be spaced from the lens mount axis FAU and, in the present example, in fact are located on the axis FAC after the alignment adjustment has been made to eliminate the decentering. Thus, there may be an error distance ED between the axes FAU and FAC as large as 0.095 mm (0.0037 in.) in view of manufacturing tolerances, as noted above. A representative diameter DR of support ring 140 is twice the radial distance RR from the camera axis FAC which therefore is also the axis of the lens mount formed by lens support ring 140. In other words, the combination unit 20 that combines the B4 lens mount formed at threads 25 and the image detector device 26 becomes decentered by reason of the adjustable mounting of screws 102 on support ring 140 to thereby center the CCDs 30 on the support ring 140 for axially aligning lenses mounted on support ring 140 on the CCDs 30.

As described above, the lens support ring 140 is provided with an external thread 150 on which a lens lock ring 152 (see FIG. 6) is threadedly mounted. The lock ring 152 has four circumferentially extending slots 154 on its inner circumference for receiving four circumferentially extending flanges on the base of a lens in a relatively conventional manner. After the lens housing has been inserted through the slots 154, the lock ring 152 is rotated by the handle 156 to lock the base of the lens firmly against the support ring 140 and, in turn, the face plate 100 in a precise location whereby the axis of the lens is aligned with the axis FAC of the lens port of the camera 10 formed by the lens support ring 140. The conventional B4 lens mount on the combination unit 20 remains accessible and includes an external ring thread 25 spaced inwardly from the support ring 140 but not necessarily concentric therewith after the adjustable mounting of the combined unit 20 described above. The conventional B4 lens mount may be used by removing the lock ring 152 and threadedly installing a smaller lock ring 27 (see FIG. 7) on the external threads 25. The smaller lock ring 27 is provided, for example, with three circumferentially extending slots 27a comparable to slots 154 of lock ring 152 for receiving flanges of a conventional B4 lens base housing (not shown) whereupon the lock ring 27 may be rotated by a handle 27b to lock in place the smaller lens, such as conventional video lenses designed for a B4 mount.

Referring more specifically to FIGS. 19–21, the support ring 140 is provided with counterbored holes 147 at the location of each of the slots 146 for accommodating the heads of the machine screws 102 and yet positioning the heads of the machine screws 102 at a substantial depth relative to the outer extremity of the ring 140. In contrast, the machine screws 141 which are at a radially outward positions from the center of slots 146 are counterbored only to the depth of the head of the screw, as shown in FIG. 22. As also shown in FIGS. 21 and 22, a cup shaped ring 153 is provided between support ring 140 and the combined unit 20 for receiving an o-ring 154 of radio frequency shielding material, as is also provided with the conventional camera face plate 16.

Referring now to FIGS. 23–30, a further feature of the lens mount apparatus of the present invention is shown that is compatible with the previously described and shown features. Specifically, these figures illustrate a conventional lens 8 adapted to be mounted on the previously described replacement face plate 100 using the larger lens mount support ring 140 and lock ring 152 even though the conventional lens 8 was not originally designed to fit this size or configuration of lens mount. The conventional lens 8 is diagrammatically illustrated as a fixed focal length lens with a focus adjustment but could be any type of lens including wide-angle zoom, standard zoom, or telephoto-zoom lenses which would be of substantially greater length and weight. As noted in describing the background of the present invention, photographers and directors often have preferences for particular lenses or have such lenses available to them that they wish to use rather than buying new lenses or renting lenses that are specifically built to fit either the B4 lens mount or the larger lens mount formed by support ring 140 and lock ring 152. However, such conventional lenses have a lens housing at their base for mounting in another type and size of lens mount which provides the correct axial distance from the base of the lens to the image plane that is not easily reproducible in the environment of the lens mount apparatus of the present invention that provides two separate lens mount arrangements. In other words, there are substantial size and axial spacing problems in converting such conventional lenses to fit the lens mount apparatus of the present invention.

By the present invention, a lens mount housing 160 is provided that has a lens support socket 162 machined to the proper diameter and depth to accommodate the base member 8a of the conventional lens 8, which socket 162 will vary for different conventional lenses. The lens mounting housing 160 is provided with a plurality of holes 164 extending axially through the area of the socket 162 for receiving machine screws to attach the housing 160 to the base 8a and the pattern of holes 164 will vary depending on the base of the conventional lens 8, although multiple hole patterns may be provided for accommodating more than one different conventional lens 8. The lens mount housing 160 is provided with a cylindrical portion extending toward the camera having arcuate projections 166 and arcuate notches 168 circumferentially between such projections 166. The projections 166 have external cylindrical surfaces that slidably engage a cylindrical bore 170 of the lens support ring 140 (see FIG. 27) which provides both alignment and support for the lens 8 with respect to the lens support ring 140. Thus, the relative sizes are important to these functions and it is preferred that the arcuate projections 166 have an external diameter D1 of 2.8600 in., to +0.0000, −0.0003 and that the cylindrical bore 170 diameter is 2.8605 in., +0.0005 in., −0.0000 in. Between the arcuate projections 166, the notches 168 extend a distance D2 of 0.250 in. to provide space for accommodating the machine screws 102 (see FIG. 26) that mount the combination unit 20 to the support ring 140 as previously described. The lens mount housing 160 is provided with four external flanges 172 of an outside diameter D3 between 3.100 in. and 3.300 in., and that extend circumferentially for about 42° which is a distance less than the circumferential extent of slots 154 in lock ring 152 (see FIG. 6) whereby the lens mount housing 160 with the lens 8 mounted thereon may be installed on the front of the camera by inserting the flanges 172 through the slots 154 and turning the locking ring 152 with the handle 156 in a conventional manner. The flanges 172 are of a thickness D4 of 0.125 in., +0.001, −0.000 in., and are supported on an outer annular surface 174 on the support ring 140 for providing the precise axial positioning of the conventional lens 8 with respect to the image plane of the camera. The arcuate projections 166 provide the axial alignment and lens support by engaging the cylindrical surface 170 of the lens support ring 140. The outer diameter D5 on housing 160 is preferably about 2.820 in. for accommodating the lock ring 152 inner diameter between slots 154. It should be noted that the entire lens mount housing 160 is spaced radially outwardly from the conventional B4 lens mount 24 and thread 25 thereof so that this mounting of lens 8 is completely separate from the B4 mount and axially aligns the lens 8 with the CCDs 30 of the image detector device 26. The lock ring 152 and lens mount housing 160 may have more or fewer slots 154 and flanges 172, respectively, than the four shown provided the number and sizes match.

Although specific embodiments of the present invention have been described in connection with a specific embodiment of a conventional professional video camera, it will readily appear to those skilled in the art that various modifications, additions and refinements of the specific components may be made without departing from the present invention as defined by the following claims.

What is claimed:

1. A lens mount apparatus for the front of a video camera that has a face plate and a combination video lens mount and video image detector unit mounted on the video camera face plate, comprising;
    a replacement face plate mounted on the front of the video camera as a replacement for the video camera face plate;
    a lens mount mechanism provided on said replacement face plate for selectively and interchangeably receiving lenses on an optical axis of said lens mount mechanism; and
    fasteners adjustably mounting the combination video lens mount and video image detector unit on said lens mount mechanism with an optical axis of the video image detector aligned with said optical axis of said lens mount mechanism.

2. The lens mount apparatus of claim 1, wherein said lens mount mechanism includes a lens support ring concentric with the optical axis of said mechanism, said support ring having oversized openings there through for receiving said fasteners and allowing the adjustment of the combination unit relative to said mechanism.

3. The lens mount apparatus of claim 2, wherein said oversized openings are U-shaped openings with the open end facing radially inwardly.

4. The lens mount apparatus of claim 2, wherein said support ring has an external thread for threadedly receiving a lock ring for locking a lens onto said support ring.

5. The lens mount apparatus of claim 2, wherein said support ring is removably mounted on said replacement face plate.

6. The lens mount apparatus of claim 2, wherein said support ring is of a larger diameter than the video lens mount for allowing interchangeably lenses also to be mounted on the video lens mount.

7. The lens mount apparatus of claim 1, further comprising:

a top plate positioned on the top of and at the front of the video camera, said top plate being engaged by said replacement face plate;

a bottom plate positioned on the bottom of and at the front of the video camera, said bottom plate being engaged by said replacement face plate;

said replacement face plate, top plate and bottom plate each having an inner surface that substantially fits onto an outer surface of the video camera at the locations of each of said plates; and fasteners releasably attaching each said plate to the video camera and said replacement face plate to said top and bottom plates.

8. A lens mount apparatus for removably supporting interchangeable lenses on the front of a video camera separately and alternatively to a lens mount provided with the video camera, comprising;

a replacement face plate positioned on the front of the video camera replacing the video camera face plate;

a lens mount mechanism provided on said replacement face plate for selectively and interchangeably receiving the lenses, said lens mount mechanism having an opening surrounding the opening of the lens mount of the video camera;

a top plate positioned on the top of and at the front of the video camera, said top plate being engaged by said replacement face plate;

a bottom plate positioned on the bottom of and at the front of the video camera, said bottom plate being engaged by said replacement face plate;

said replacement face plate, said top plate and said bottom plate each having an inner surface that substantially fits on an outer surface of the video camera at the locations of each of said plates; and fasteners releasably attaching each said plate to the video camera and said replacement face plate to said top and bottom plates.

9. The lens mount apparatus of claim 8, wherein said replacement face plate extends above the top of the video camera in front of said top plate.

10. The lens mount apparatus of claim 9, wherein said replacement face plate has a dovetail across the bottom thereof, and said bottom plate has a dovetail fitting onto the dovetail of said replacement face plate.

11. The lens mount apparatus of claim 8, wherein said replacement face plate has a dovetail across the bottom thereof, and said bottom plate has a dovetail fitting onto the dovetail of said replacement face plate.

12. The lens mount apparatus of claim 8, wherein said replacement face plate, said top plate and said bottom plate each extend laterally for substantially the full width of the video camera at the locations of each of said plates.

13. The lens mount apparatus of claim 8, wherein a combination lens mount and image detector unit of the video camera is mounted on an inside surface of said lens mount mechanism and extends behind said replacement face plate.

14. The lens mount apparatus of claim 13, wherein said lens mount mechanism is provided with an adjustable support for mounting the combination unit on the inside of said lens mount mechanism with the image detector device centered on said lens mount mechanism.

15. The lens mount apparatus of claim 14, wherein said adjustable support includes oversized openings for receiving machine screws threadedly connected to said combination unit for allowing adjustment movement of said combination unit relative to said lens mount mechanism in a plane parallel to said replacement face plate.

16. The lens mount apparatus of claim 10, wherein a combination lens mount and image detector unit of the video camera is mounted on an inside surface of said lens mount mechanism.

17. The lens mount apparatus of claim 16, wherein said lens mount mechanism is provided with an adjustable support for mounting the combination unit on the inside of said lens mount mechanism with the image detector device centered on said lens mount mechanism.

18. The lens mount apparatus of claim 17, wherein said adjustable support includes oversized openings for receiving machine screws threadedly connected to said combination unit for allowing adjustment movement of said combination unit relative to said lens mount, mechanism in a plane parallel to said replacement face plate.

19. A lens mount apparatus for removably supporting interchangeable lenses on the front of a video camera separately and alternatively to a lens mount provided with the video camera, comprising;

a reinforcing structure mounted on the front of the video camera and extending over a portion of the top of the video camera;

said reinforcing structure having an inner surface that substantially fits an outer surface of the video camera at the front and top;

a lens mount mechanism provided on a front of said reinforcing structure for selectively and interchangeably receiving the lenses, said lens mount mechanism having an opening surrounding the opening of the lens mount of the video camera; and fasteners releasably attaching each said reinforcing structure to the front, top and bottom of the video camera.

20. The lens mount apparatus of claim 19, wherein said reinforcing structure is comprised of at least two separate plates fastened together.

21. The lens mount apparatus of claim 19, wherein said reinforcing structure is comprised of three separate plates with one on the front, one on the top and one on the bottom, said plate on the bottom extending over a portion of the bottom of the video camera, and said three separate plates fastened together.

22. The lens mount apparatus of claim 19, wherein a combination lens mount and image detector unit of the video camera is adjustably mounted on the inside of said lens mount mechanism for centering the image detector relative to said lens mount mechanism.

23. A lens mount apparatus for removably supporting interchangeable lenses on the front of a video camera that has a face plate and a combination video lens mount and video image detector unit mounted on the video camera face plate, comprising:

a replacement face plate mounted on the front of the video camera as a replacement for the video camera face plate;

a lens mount mechanism mounted on said replacement face plate for selectively receiving the interchangeable lenses on an optical axis of said lens mount mechanism;

fasteners adjustably mounting the combination video lens mount and video image detector unit on said lens mount mechanism with an optical axis of the video image detector aligned with said optical axis of said lens mount mechanism; and a lens mount housing comprising a base for the replaceable lens, said lens mount housing having axially extending arcuate projections for slidably engaging an axially facing internal surface on said lens mount mechanism for supporting and axially aligning the lens on the lens mount mechanism, said arcuate projections being circumferentially spaced from each of said fasteners when said lens mount housing is locked in position on said lens mount mechanism.

24. The lens mount apparatus of claim 23, wherein said arcuate projections comprise a major portion of the circumference of said lens mount housing.

25. The lens mount apparatus of claim 24, wherein said lens mount housing is provided with an axially facing mounting surface for engaging an opposing axially facing mounting surface on the lens mount mechanism, said axially facing surfaces being outwardly, in both a radial and an axial direction, from said arcuate projections.

26. The lens mount apparatus of claim 23, wherein said lens mount housing is provided with an axially facing mounting surface for engaging an opposing axially facing mounting surface on the lens mount mechanism, said axially facing surfaces being outwardly, in both a radial and an axial direction, from said arcuate projections.

27. The lens mount apparatus of claim 23, wherein said arcuate projections have an external surface of a diameter less than about 0.0013 in. smaller than a diameter of said internal surface on said lens mount mechanism.

28. The lens mount apparatus of claim 27, wherein said arcuate projections external surface is of a 2.8600 in., +0.000 in., −0.003 in., diameter.

29. The lens mount apparatus of claim 26, wherein said axially facing mounting surface on said lens mount housing is provided on a plurality of radial flanges.

30. The lens mount apparatus of claim 29, wherein said lens mount housing has four said radial flanges, and said radial flanges are equally spaced circumferentially.

31. The lens mount apparatus of claim 29, wherein each said radial flange has an axial thickness of about 0.125 in.

* * * * *